Patented Feb. 2, 1932

1,843,196

UNITED STATES PATENT OFFICE

ABRAHAM SIDNEY BEHRMAN, OF CHICAGO, ILLINOIS

MANUFACTURE OF HYDROCHLORIC ACID

No Drawing. Application filed June 13, 1929. Serial No. 370,737.

This invention relates to the preparation of acids and especially to the halogen acids. More particularly, this invention relates to the synthesis of an aqueous solution of hydrochloric acid from chlorine, carbon and water.

A principle object of the present invention is to provide a simpler and more economical method of making hydrochloric acid and similar halogen compounds than has hitherto been available.

Another object of this invention is to provide an improved method of preparing and concentrating or purifying hydrochloric and other halogen acids.

A further object of this invention is to provide a method of producing aqueous hydrochloric acid directly from water and chlorine.

Other objects will appear during the course of the following description.

In a preferred embodiment of the present invention chlorine gas, in the presence of water and of carbon, is converted into a strong and substantially pure solution of hydrochloric acid. The water is employed in the liquid state. The carbon is preferably of the active or activated kind of which there are several suitable varieties now available. The chlorine gas employed is usually at substantially normal atmospheric temperature and pressure, the only additional pressure required being that necessary to overcome the frictional and other incidental losses through the process.

In the past it has been proposed to manufacture hydrochloric acid from chlorine, carbon and steam. In all such proposals, however, a mixture of chlorine gas and water vapor has been passed through a bed of carbon heated by external means to temperatures ranging from above the boiling point of water to actual incandescence of the carbon; and very careful control of furnace temperatures, and of proportions of chlorine and steam, have been required in order to insure proper functioning of the process. The product in all cases has been hydrogen chloride gas, mixed with other gaseous products of the reaction. The absorption of the hydrogen chloride in water, and the separation of the waste gases have been carried out in subsequent steps of the processes described.

None of these proposed processes has come into extensive use, due possibly to the careful control and other operating difficulties and expenses involved. The principal method of manufacturing hydrochloric acid at present is the very old one based on the action of sulfuric acid on sodium chloride. A minor source of supply is that obtained from burning hydrogen gas in an atmosphere of chlorine.

The manufacturing economies in the use of my invention, compared with the other methods described, will be obvious on considering two preferred embodiments of the invention which will now be described. In one embodiment adapted to the continuous production of a solution of hydrochloric acid, chlorine gas is passed upwardly through a bed of lump or granular activated carbon contained in a suitable receptacle. Water is caused to trickle downwardly through the bed. The bottom of the chamber containing the bed of carbon may be provided with a suitably controlled outlet and/or liquid seal, in order to permit relatively free discharge of the solution of hydrochloric acid formed, while preventing the escape of chlorine gas. Suitable flow meters and control devices may be provided for the chlorine gas and water, and the amounts and proportions of these reagents are adjusted in accordance with the concentration of acid solution desired. Other conditions being equal, the depth of carbon bed in a reaction chamber has an important bearing on the maximum concentration of acid obtainable. In some laboratory experiments, for example, increasing the depth of carbon bed from about two inches to about ten inches made it possible to increase the concentration of acid in the effluent from about 3% to about 17% by weight of HCl.

It is generally desirable to adjust operating conditions so that the temperature rise throughout the system is minimized, having in mind the highly exothermic nature of the reaction:

(1) $C + 2Cl_2 + 2H_2O = 4HCl + CO_2$ by which presumably my process functions. This reaction is conveniently divided into two stages:

(a) $2Cl_2 + 2H_2O = 2HCl + 2HClO$
(b) $2HClO + C = 2HCl + CO_2$

In general it is preferable to keep the reaction temperature well under the boiling point of water, and as near room temperatures as practicable, as it has been found that with higher temperatures the overall efficiency of the system is frequently considerably diminished.

As a rule, the reaction is carried out under such conditions that no free chlorine escapes with the exit gases. Operating in this way, complete separation of the waste gases is effected in the reaction chamber itself. The waste gases may be led off from the reaction chamber and discharged to atmosphere, or collected and used, as desired. This method of operation is not mandatory, however, as, in the event that the exit gases contain free chlorine, they may be led to the gas inlet of a succeeding reaction chamber. If the desired concentration of acid is not obtained from one reaction chamber, this solution may be strengthened by using it in place of part, or all, of the water employed in one or more subsequent reaction chambers; or other well known methods of concentration, such as distillation, etc., may be employed.

Acid of various concentrations from about 1% to about 35% may be readily prepared by the process of the present invention.

The solution of hydrochloric acid resulting from this process will generally contain free chlorine. By passing this chlorine-contaminated hydrochloric acid through a bed of carbon, or by other suitable treatment with carbon, the free chlorine may be converted to hydrochloric acid.

It follows that the present process may also be utilized for the purification and/or concentration of solutions of hydrochloric or other halogen acids. For example, instead of reacting water with carbon and chlorine or other halogen, it is possible to react an aqueous solution of halogen acid with carbon and a halogen and so produce an acid of greater concentration. Or a solution of a halogen acid containing free halogen as an impurity or as a result of decomposition of the acid may be purified by contacting the solution with carbon under the conditions specified above.

In the continuous method of preparing hydrochloric acid, the synthesis, concentration and purification steps may all be carried out successively. In this case, a series of beds of activated carbon is provided and the water and/or solution of hydrochloric acid caused to flow successively downwardly through the beds. Chlorine gas is introduced into the reaction chamber next to the last in the series, or into any or all of the reaction chambers except the last, depending on whether or not free chlorine is permitted to be present in the exit gases from any reaction chamber. The flow of chlorine is countercurrent to the flow of liquid, both with relation to a single reaction chamber, and to the series where series flow of the gas is employed. The last reaction chamber in the series, to which chlorine is not admitted, is utilized for the conversion of any free chlorine in the acid solution to hydrochloric acid.

The method of production of hydrochloric acid just described may be made completely continuous by providing means for the regular addition to the reaction chamber of carbon to replace that consumed in the chemical reaction shown above. In case this is done, since almost any carbon used will contain some inert matter, provision should also be made for the removal of the spent carbon.

In another embodiment of the invention which is adapted to the intermittent or batch prepartion of a solution of hydrochloric acid, chlorine gas is passed through a chamber containing carbon and water, either an aqueous suspension of carbon, or a bed of granular carbon with the interstices substantially completely filled with water. When the desired concentration of hydrochloric acid has been obtained, any excess carbon is removed by filter pressing, draining, or other appropriate means. In this modification of the invention, it is generally preferable to employ a number of reaction chambers in series, as it is usually not practicable to provide complete absorption of the chlorine in one chamber.

In both embodiments of the invention which have been described, it is obviously desirable that all reagents should be as pure as practicable. This applies not only to the chlorine gas and to the water, but to the carbon as well. If the carbon contains an objectionable amount of hydrochloric acid-soluble matter, it is frequently desirable to subject the carbon, before use, to treatment with a strong, hot solution of hydrochloric or with another acid to remove the objectionable impurities.

If the activity of the carbon is diminished to an undesirable extent before the carbon is consumed, in any embodiment of the invention, the carbon may be reactivated by the employment of heat, steam or any other suitable method, the reactivation being carried out either inside or outside of the reaction chamber, according to convenience.

In preparing a solution of hydrochloric acid by the continuous process described above, I have obtained excellent results with an activated carbon prepared from certain Texas lignites, which is activated by distillation at high temperatures followed by treatment with hydrochloric acid. A carbon bed made up of this material in particles ranging in size from about four to ten mesh makes available a large amount of surface for reaction, while still making possible only a relatively small pressure loss through the bed. The same carbon may also be used successfully in the intermittent or batch method of preparation, in which method I have also used advantageously another activated carbon which is prepared from paper mill waste liquors.

By the term "water" as used in this specification and the appended claims is meant water in the liquid state, as distinguished from steam and water vapor. By the term "carbon" is included activated carbons, wood charcoals, bone char, lignite, and equivalents.

While the present invention is directed primarily to the manufacture of hydrochloric acid in the manner described, it will be evident that other compounds may be prepared in a similar way by substituting for chlorine gas some other gas such as bromine which forms with water an oxidizing solution capable of being reduced by carbon; by substituting for water some other liquid which will react with the chlorine to produce a readily reducible compound; and by substituting for the carbon some other highly porous adsorbent of a reducing nature.

It will be apparent at once to one skilled in the art that many variations in amounts and proportions of reagents, in temperatures, in mechanical arrangements, and in operating and other conditions may be practiced in the application of the fundamental principles of my invention, and that the characteristics of the product obtained, and the economies of production may consequently vary over a wide range. All such variations and modifications are comprised within the scope of the invention as defined in the claims.

What is claimed is:

1. In the process of preparing a solution of hydrochloric acid the step which comprises reacting chlorine, water in the liquid phase and carbon.

2. The process of preparing a solution of hydrochloric acid which comprises reacting chlorine, water in the liquid phase and carbon at temperatures below 100° C.

3. The process of preparing a solution of hydrochloric acid which comprises passing chlorine gas and water in the liquid phase countercurrently through a mass of carbon.

4. The process of preparing a solution of hydrochloric acid which comprises passing water in the liquid phase downwardly through a bed of carbon, passing chlorine up through the bed, and removing a solution of hydrochloric acid at the bottom of the bed.

5. A process of concentrating hydrochloric acid which comprises contacting an aqueous solution of hydrochloric acid with activated carbon and chlorine.

6. A process of purifying aqueous hydrochloric acid solutions containing chlorine which comprises contacting said solutions with carbon.

7. A process of producing concentrated hydrochloric acid which comprises providing a series of beds of carbon, passing water in the liquid phase successively through these beds, introducing gaseous chlorine into one or more beds before the last bed of the series and causing said chlorine to pass countercurrently to the flow of water through the successive beds.

8. A process of producing concentrated hydrochloric acid which comprises providing a series of beds of carbon, passing water in the liquid phase successively downwardly through these beds, introducing gaseous chlorine into the bottom of one or more of the beds before the last bed of the series and causing it to pass countercurrently to the flow of water up through the successive beds.

9. The process of preparing a solution of hydrochloric acid which comprises passing chlorine gas into a body of water in the liquid phase containing carbon, and concentrating the hydrochloric acid so formed.

10. The process of preparing a solution of hydrochloric acid which comprises passing chlorine gas into a body of water in the liquid phase containing carbon.

11. The process of preparing a solution of hydrochloric acid which comprises passing chlorine gas into a body of water in the liquid phase containing carbon until the maximum possible concentration is obtained.

12. The process of preparing a solution of hydrochloric acid which comprises passing chlorine gas through a series of bodies of water in the liquid phase containing carbon.

13. In the process of preparing a solution of a halogen acid the step which comprises reacting a halogen, water in the liquid phase and carbon.

14. A process of making hydrochloric acid which comprises reacting together carbon, water in the liquid phase and chlorine to form an aqueous solution of hydrochloric acid containing chlorine, then reacting this aqueous solution with additional carbon.

15. A process of increasing the strength of an aqueous hydrochloric acid solution which comprises introducing chlorine into the aqueous hydrochloric acid solution and then reacting in the liquid phase with activated carbon.

16. The process of preparing an aqueous solution of hydrochloric acid, which comprises subjecting one portion of water in the liquid phase to a succession of treatments with chlorine gas and carbon.

17. A process of purifying an aqueous halogen acid solution containing uncombined halogen which comprises contacting said solution with carbon, the uncombined halogen in the solution thus contacted being the same as that which constitutes the negative radical of the halogen acid.

In testimony whereof I have hereunto subscribed my name.

ABRAHAM SIDNEY BEHRMAN.